(12) United States Patent
De Froment

(10) Patent No.: US 8,774,764 B2
(45) Date of Patent: *Jul. 8, 2014

(54) METHOD AND SYSTEM FOR PEER-TO-PEER ENFORCEMENT

(75) Inventor: Eric De Froment, Ostermundigen (CH)

(73) Assignee: Swisscom AG (CH)

( * ) Notice: Subject to any disclaimer, the term of this patent is extended or adjusted under 35 U.S.C. 154(b) by 69 days.

This patent is subject to a terminal disclaimer.

(21) Appl. No.: 13/536,486

(22) Filed: Jun. 28, 2012

(65) Prior Publication Data

US 2012/0270526 A1 Oct. 25, 2012

Related U.S. Application Data

(63) Continuation of application No. 12/840,902, filed on Jul. 21, 2010, now Pat. No. 8,233,883, which is a continuation of application No. 11/385,663, filed on Mar. 22, 2006, now Pat. No. 7,840,205.

(30) Foreign Application Priority Data

Mar. 22, 2005 (EP) ..................................... 05102294

(51) Int. Cl.
*H04M 1/66* (2006.01)
*H04M 1/68* (2006.01)
*H04M 3/16* (2006.01)

(52) U.S. Cl.
USPC ...... 455/411; 455/41.2; 455/41.3; 455/414.1; 455/422.1; 455/436; 455/437; 455/438; 455/444; 455/450; 455/552.1; 455/553.1; 370/310.2; 370/331; 370/332; 370/333; 370/334; 370/335; 370/338

(58) Field of Classification Search
USPC ......... 455/41.2, 41.3, 411, 422.1, 414.1, 450, 455/458, 552.1, 553.1, 436–444; 370/310.2, 331–335, 338
See application file for complete search history.

(56) References Cited

U.S. PATENT DOCUMENTS 5,781,860 A 7/1998 Lopponen et al.
7,016,673 B2 3/2006 Reddy et al.
(Continued)

OTHER PUBLICATIONS

Srinivas Kandala, et al., "Direct Link Protocol Specification", IEEE 802.11-02/438r2: Wireless Lan Conference, XP-002314796, Sep. 2002, pp. 1-12.

(Continued)

*Primary Examiner* — Steve D Agosta
(74) *Attorney, Agent, or Firm* — McAndrews, Held & Malloy, Ltd.

(57) ABSTRACT

The present invention concerns a method and a system for establishing a dynamic peer-to-peer communications channel between a first terminal and a second terminal. A first terminal and a second terminal are connectable over secured communications channels to a secured network. The first terminal sends a connection request for establishing a communications channel between the terminals. The connection request is intercepted and analyzed by an analyzer module. The analyzer modules requests network parameters from the first and the second terminals. Based on the intercepted connection request, and the network parameters of the terminals, the analyzer module instructs the terminal to establish a peer-to-peer communications channel over a network distinct from the secured network. Security of the peer-to-peer communications channel may be maintained by means of a central unit of the secured network. In this regard, the central unit may send to the terminal authentication keys and/or encryption keys.

20 Claims, 1 Drawing Sheet

(56) References Cited

U.S. PATENT DOCUMENTS

| | | | |
|---|---|---|---|
| 7,123,878 B1 | 10/2006 | Heinonen et al. | |
| 2004/0240405 A1* | 12/2004 | Okazaki | 370/315 |
| 2005/0226183 A1 | 10/2005 | Penumetsa | |
| 2008/0259793 A1 | 10/2008 | Bauer et al. | |

OTHER PUBLICATIONS

Rosario Macri, "Wireless Security: A Silver Lining Ahead", www.psionteklogix.com, XP002314797, Apr. 10, 2003, pp. 1-15.

S.J. Kerry, et al., "Draft Supplemental to Standard for Telecommunications and Information Exchange Between Systems-LAN/MAN Specific Requirement-Part 11: Wireless Medium Access Control (MAC) and Physical Layer (PHY) specifications: Specification for Enhanced Security", IEEE Draft Standards, XP-002314798, Nov. 2002, pp. 1-140.

\* cited by examiner

METHOD AND SYSTEM FOR PEER-TO-PEER ENFORCEMENT

CROSS-REFERENCE TO RELATED APPLICATIONS

This application is a continuation of U.S. patent application Ser. No. 12/840,902, which was filed on Jul. 21, 2010, now U.S. Pat. No. 8,233,883 and which was a continuation of U.S. patent application Ser. No. 11/385,663, which was filed on Mar. 22, 2006, now U.S. Pat. No. 7,840,205, and which is based upon and claims the benefit of priority from prior European Application No. 05102294.5, filed Mar. 22, 2005. Each of above stated applications is hereby incorporated herein by reference in its entirety.

BACKGROUND OF THE INVENTION

1. Field of the Invention

The present invention relates to a method and a system for establishing a dynamic communications channel between a first terminal and a second terminal, wherein the first terminal is connected over a first secured communications channel to a secured network, and wherein the second terminal is connected over a second secured communications channel to the secured network.

2. Description of the Related Art

Mobile devices—especially mobile devices with more than one network interface—are used more and more extensively by mobile or nomadic users for e.g. accessing, reading, writing, manipulating, or storing different kinds of data. Mobile devices comprise, for example, cellular phones, personal digital assistants, or mobile personal computers, which are also known as notebooks or laptops. Network interfaces comprise, for example, wired network interfaces for accessing e.g. a Local Area Network (LAN), modems for accessing remote networks over e.g. a Public Switched Telephone Network (PSTN), or wireless network interfaces for accessing e.g. a Wireless Local Area Network (WLAN). Users of mobile devices may read and write e-mail messages or text documents, or may access or manipulate multimedia data such as images, audio data, or video data. For example, a sales person of a company who is visiting a client also has a need to access secured, trusted data of his company. In order to access secured data, a mobile device may be connected through a secured connection to a security gateway of a corporate network. Such secured connections comprise, for example, authenticated and encrypted connections using the IPsec protocol (IPsec: Internet Protocol secured) or the SSL protocol (SSL: Secured Socket Layer). For example, a sales person with a need to access secured data of his company may connect his mobile device to a network of the client, for example with a WLAN network. The WLAN network may provide access to the Internet. The security gateway of the corporate network, for example, is configured to receive IPsec connections from the Internet. As soon as the sales person connects his mobile device through a secured communications channel, such as an IPsec connection, to the security gateway of his company, the mobile device may become part of the network of the company, and may benefit from various access rights to corporate data stored on computers or servers of the company. In other words, the mobile device of the sales person is, to at least some extent, part of the network of the sales person's company. Through the security gateway of the company, mobile devices are connectable to the network of the company from various locations. Therefore, a sales person using his mobile device at a first location and a technical advisor using his mobile device at a second location, for example, are able—through the secured network—to access data on each other's mobile device. However, it is a drawback that all traffic between mobile devices has to go through the network of the company, even if, for example, the mobile devices of the sales person and the technical advisor would be connectable through a further, maybe more efficient network. A further drawback is that the secured network of the company may become compromised or broken up, if, for example, the sales person or the technical advisor decide to configure their mobile devices to establish a peer-to-peer communication channel between their mobile devices. It is also a drawback that data transfer—through the secured network—between mobile devices requires many data encapsulations diminishing the performance of the data transfer and that the security gateway of the secured network may be a bottleneck due to the concentration of traffic load.

SUMMARY OF THE INVENTION

It is the object of the present invention to propose a new method and system for establishing a dynamic communications channel between a first terminal and a second terminal, wherein the first terminal is connected over a first secured communications channel to a secured network, and wherein the second terminal is connected over a second secured communications channel so to the secured network, which method and system do not have the drawbacks of the prior art.

These objects are achieved according to the present invention through the elements of the independent claims. Further preferred embodiments follow moreover from the dependent claims and from the specification.

The above-mentioned objects are achieved through the present invention in that the first terminal generates a connection request for establishing a communications channel between the first and the second terminal, in that the connection request is received and analyzed by an analyzer module, in that network parameters of the first terminal and of the second terminal are received and analyzed by the analyzer module, and in that the analyzer module, based on the analysis of the connection request and the network parameters of the terminals, transmits a connection instruction to the first and/or second terminal for establishing a peer-to-peer communications channel—over a network distinct from the secured network—between the first terminal and the second terminal. The present invention has the advantage that data transfer, especially between mobile devices, can be performed more efficiently by dynamically establishing a peer-to-peer communications channel between respective terminals. The present invention has the further advantage that network traffic to and from a corporate network can be lowered, leading especially to less bottleneck problems for security gateways of the corporate network.

In an embodiment variant, the peer-to-peer communications channel between the first terminal and the second terminal is established as a secured peer-to-peer communications channel by means of authentication and/or encryption modules. For example, cryptography data comprising authentication keys and encryption keys may be provided by the analyzer module to authentication and/or encryption modules of the first and second terminal, such that the peer-to-peer communications channel between the first and the second terminal can be established according to defined security conditions. Such an embodiment variant has the advantage that security conditions of the secured network may be met.

In another embodiment variant, authentication and/or encryption keys are provided to the authentication and/or encryption modules by a central unit of the secured network. Such an embodiment variant has the advantage that authentication and/or encryption keys may be provided according to definable security conditions of the secured network.

In another embodiment variant, the central unit receives parameters on the status of the first terminal and/or second terminal at determinable points in time, and an established peer-to-peer communications channel is torn down as soon as the status of the first and/or second terminal do not meet determinable conditions. Such an embodiment variant has the advantage that security of the secured network can be improved by tearing down peer-to-peer communications channels between terminals that are not fully connected to the secured network anymore, for example when the first secured communications channel between the first terminal and the secured network is not functional anymore.

In a further embodiment variant, the connection request generated by the first terminal is intercepted by the analyzer module. When the connection request is intercepted by the analyzer module, the connection request is not sent through one of the network interlaces of the first terminal, but the connection request is kept on the analyzer module. Such an embodiment variant has the advantage that data transfer between the first and second terminal may be handled transparently, e.g. the analyzer module stores the connection request and that the connection request is sent—possibly in modified format—over the dynamically established peer-to-peer communications channel between the first and the second terminal.

In another embodiment variant, the first and second secured communications channel between the first terminal and the secured network and between the second terminal and the secured network are established by using public access points for connecting the terminals to public networks, by using communications channels between the public networks and the secured network, and by using cryptographic modules for authentication of the terminals and for encryption of the communications channels between the terminals and the secured network. For example, the public network is the Internet. Such an embodiment variant has the advantage that users of mobile devices may benefit from dynamically established peer-to-peer communications channels at a wide variety of locations.

In another embodiment variant, the peer-to-peer communications channel between the first terminal and the second terminal is established using at least one public network. For example, the public network is the Internet, Such an embodiment variant has the advantage that users of mobile devices may benefit from a widely available and powerful network for the establishment of peer-to-peer connections. For example, (bra secured network located in Europe and for mobile terminals located in America, communications between mobile terminals may become much more efficient.

In another embodiment variant, the peer-to-peer communications channel between the first terminal and the second terminal is established over an ad-hoc network between the first terminal and the second terminal. For example, the ad-hoc network is based on a Bluetooth network. Such an embodiment variant has the advantage that users of mobile devices sitting nearby each other may benefit from locally available network resources. For example, mobile terminals located in a train and connected through GPRS (General Packet Radio Service) with a secured network can be connected more efficiently over an ad-hoc Bluetooth network.

Another object of the present invention is to provide a novel method for establishing a dynamic communications channel between a first terminal and a second terminal. The method includes: receiving a connection request at an analyzer, the connection request including instructions to establish a communications channel between the first terminal and the second terminal. The method also includes receiving network parameters of the first terminal and the second terminal at the analyzer, analyzing the received connection request and the network parameters at the analyzer, and transmitting, from the analyzer to at least one of the first terminal or the second terminal, a peer-to-peer connection instruction including instructions to establish a peer-to-peer communications channel over another network and between the first terminal and the second terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
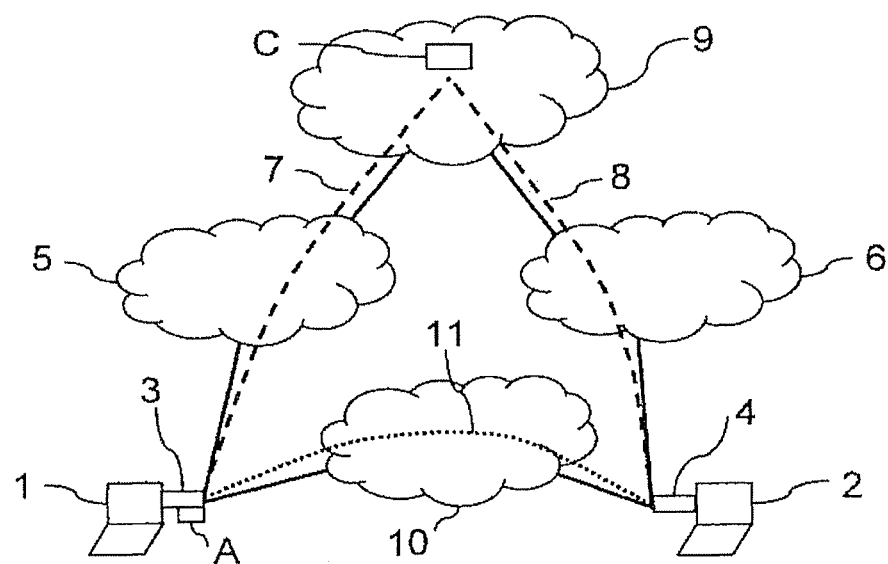
FIG. 1 is a block diagram of a system according to an embodiment of the present invention.

Referring now to the drawings, wherein like reference numerals designate identical or corresponding parts throughout the several views.

FIG. 1 shows a block diagram representing schematically an example of system for establishing a dynamic peer-to-peer communications channel between a first terminal (1) and a second terminal (2) according to an embodiment of the present invention.

In FIG. 1, the reference numeral 1 refers to a first terminal, and the reference numeral 2 refers to a second terminal. The first terminal 1 and the second terminal 2 preferably are portable mobile devices with at least one network interface. The reference numeral 3 refers to network interfaces of the first terminal 1 and the reference numeral 4 refers to network interfaces of the second terminal 2. Network interfaces of terminals 1,2, such as for example of notebooks or laptops, may comprise a network interface 3,4 for connecting to a wired network, e.g. according to an IEEE 802.3 Ethernet Standard, a network interface for connecting to distant networks over a Public Switched Telephone Network, e.g. by means of a modem, a network interface for connecting to a Wireless Local Area Network, e.g. according to a IEEE 802.11 standard, network interface for connecting to a GSM (Global System Mobile) or UMTS (Universal Mobile Telecommunications System) based mobile network, as well as a network interface for directly connecting to closely located devices e.g. according to a Bluetooth or a IrDA (Infrared Data Association) standard.

In FIG. 1, the reference numeral 9 refers to a secured network. A network may be referred to as a secured network, if trunks, connections, switches, wires, routers, etc. belonging to the network are operated according to defined conditions, e.g. according to a security policy and/or according to security guidelines of a company. The secured network 9 comprises technical means, for example access controls to buildings with network devices, for providing security and is, or may be, connected with secured devices only. A device may be considered to be secured, if, for example, the device is configured according to defined specifications, e.g. by using a trusted operating system, and/or by installing the device within defined buildings, e.g. within buildings with restricted access only, of a company. Secured remote access to the secured network 9 may be accomplished by means of a security gateway, e.g. by means of an IPsec concentrator.

In FIG. 1, the reference numerals 5,6 refer to networks suitable for a secured remote access of terminals 1,2 to the secured network 9, e.g. to the network of an Internet Service Provider, to a WLAN network, or to any other network. As shown in FIG. 1, networks 5, 6 are connectable to the secured network 9. The connection between a network 5,6 and the secured network 9 may comprise direct links, e.g. ADSL subscriber lines (ADSL: Asynchronous Digital Subscriber Loop), leased lines, or any other network connections, or any number of intermediate networks, e.g. networks of several interconnected Internet Service Providers, Networks 5,6 may be considered to be part of the public Internet, whereas the secured network 9 may be considered to be a private, secured network of a company connectable to the public Internet, For example, a connection originating from network 5 and entering secured network 9 may be forced to end at the security gateway of the secured network 9. By means of the security gateway of the secured network 9, any connections originating from networks 5,6 are dealt with according to definable criteria. Such criteria may comprise authentication of the originator of the connection and requirements with respect to data encryption algorithms.

In FIG. 1, the first terminal 1 is connected by means of one of the network interfaces 3 to an access point of network 5, e.g. by means of a modem. The second terminal 2 is connected by means of one of the network interfaces 4 to an access point of network 6, e.g. by means of a wireless network interface. A physical connection for transporting data packets between terminals 1, 2 and the secured network 9 is therefore established. According to definable criteria, terminals 1, 2 establish secured communications channels, e.g. IPsec connections, to the security gateway of the secured network 9. From the security gateway, the first terminal 1 and the second terminal 2 may each receive definable network identifications, e.g. IP numbers and host names. Terminals 1 and 2 may then fully or partially participate as terminals of the secured network 9 and may benefit from all policy rights and services provided within the secured network 9. For example, first policy rights may grant the second terminal 2 the right to share definable data, and second policy rights may grant the first terminal 1 the right to access shared data of the second terminal 2. Therefore, first terminal 1 may request a transfer of data from second terminal 2, which data will then be securely transferred by means of the secured network 9, e.g. through the network 6, through the security gateway of the secured network 9, and through the network 5. Such a transfer of data typically comprises an encryption and encapsulation—according to e.g. the IPsec connection between the second terminal 2 and the security gateway—of data on the second terminal 2, a de-encapsulation and decryption of data on the security gateway, an encryption and encapsulation— according to e.g. the IPsec connection between the first terminal 1 and the security gateway—of data on the security gateway, and a de-encapsulation and decryption of data on the first terminal 1.

In FIG. 1, the reference numeral A refers to an analyzer module according to an embodiment of the invention. In FIG. 1, the analyzer module A is connectable to the secured network 9. The analyzer module A is capable of analyzing data sent and/or received by terminals 1 or 2. As such, the analyzer module A may be placed at any suitable location on the data path between terminal 1 and 2. For example, the analyzer module A may be connectable to the security gateway of secured network 9, or the analyzer module A may be connectable to the network interfaces 3,4 of terminals 1,2. Preferably, the analyzer module A is designed as a software module that controls a processing unit, e.g. a micro-processor of the security gateway of secured network 9 or a micro-processor of terminals 1, 2.

The analyzer module A comprises a module for analyzing data sent and received by terminals 1,2 and also a module for receiving and analyzing parameters of terminals 1,2. When analyzing data packets sent and received by terminals 1, 2, the analyzer module A searches for a connection request, e.g. searches headers of data packets for definable patterns such as a destination port configured to share data of the second terminal 2. For example, as soon as a connection request is detected, the analyzer module A sends a request for receiving parameters of terminals 1,2 to these terminals. Corresponding parameters of terminals 1,2 are then received by the analyzer module A. Parameters of terminals 1,2 may also be received at any other point in time, e.g. every minute. The request for receiving parameters of terminals 1,2 may also comprise instructions such that terminals 1,2 send appropriate parameters as soon as changes in these parameters are detectable. Parameters of terminals 1,2 may include parameters of network interfaces 3, 4, for example parameters describing a network interface type, e.g. wired or wireless, a network interface transmission speed, a network interface load, networks connectable by the network interface, or any other parameters describing features of the network interface 3,4 or the terminals 1,2.

When analyzing parameters of terminals 1,2, the analyzer module A may compare parameters of network interface 3 with parameters of network interface 4, and may search for at least one network distinct from the secured network 9 that is suitable for establishing a peer-to-peer communications channel between the first and the second terminal 1, 2. For example, the analyzer module may detect that one of the network interfaces 3 is connectable with a WLAN network and that one of the network interfaces 4 is connectable with the very same WLAN network. The task of searching for a suitable peer-to-peer communications channel may also be performed independently by terminals 1,2, possibly with the aid of analyzer module A. The analyzer module A may also detect that terminals 1,2 both have a connection to the Internet. In any case, the analyzer module A may send configuration data to the first and/or second terminal for configuring and establishing a peer-to-peer communications channel over a network that is distinct from the secured network 9. This may involve the steps of sending credential data, e.g. a certification token, to terminals 1,2 and of sending the instruction to terminals 1,2 to establish a peer-to-peer communications channel between terminals 1,2. For example, credential data may include authentication keys and secret keys for an encryption algorithm.

Figure 2:
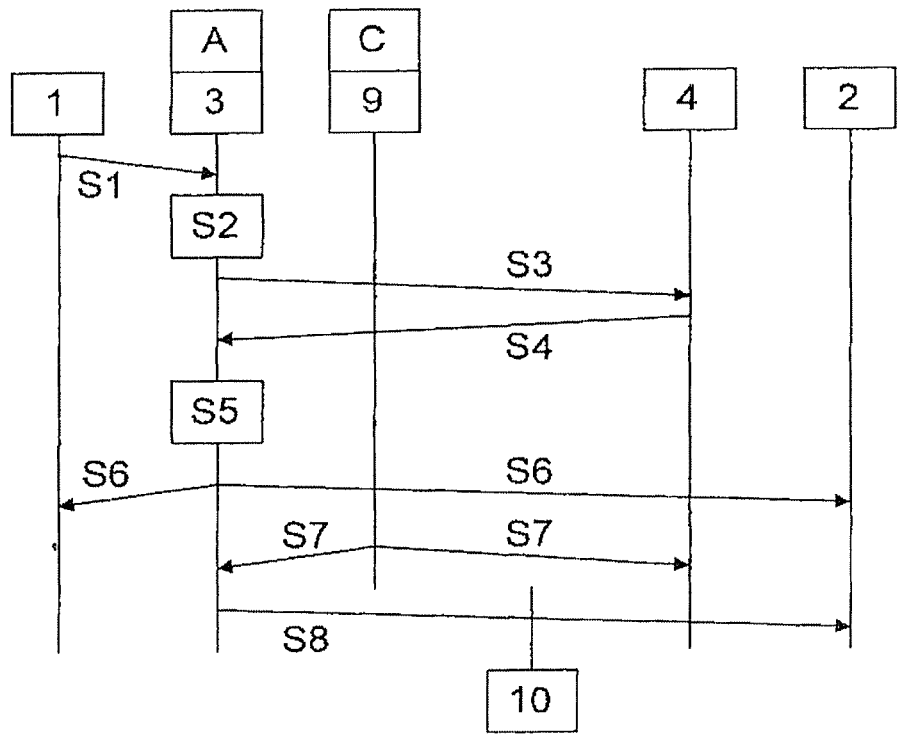
FIG. 2 is a sequence diagram of a system according to an embodiment of the present invention.

With reference to FIG. 2, the course for establishing a dynamic peer-to-peer communications channel between a first and a second terminal according to an embodiment of the present invention will be described in the following paragraphs. Initially, the first terminal 1 and the second terminal 2 are connected over the networks 5,6 to the secured network 9 by means of secured communications channels 7,8.

In step S1, the first terminal 1 generates a connection request for connecting the first terminal 1 to the second terminal 2. The connection request may be initiated by an application program running on terminal 1. For example, the connection request may be initiated by an FTP (File Transfer Protocol) client program, by a file manager program, or by any other means. The connection request may be based on any suitable protocol. For example, the connection request may be based on a FTP protocol, on a SMB (Server Message Block) protocol, or on a NFS (Network File System) protocol. The connection request may comprise data for receiving a file from the second terminal 2. Typically, the connection request may comprise a source address of the second terminal, a destination address of the first terminal, a port number of the second terminal, and a "get" instruction to transfer a file from the second terminal to the first terminal. As such, the connection request will be sent towards terminal 2 by means of network interface 3, secured communications channel 7, secured network 9, secured communications channel 8, and network interface 4.

In step S2, the analyzer module A receives, analyzes, and potentially intercepts the connection request. Based on data contained in the connection request, the analyzer module A may detect that the connection request would lead to data transmission from the second terminal 2 to the secured network 9 and to the first terminal 1. Upon such detection, the analyzer module may be configured to search for modes for a more efficient data transmission, leading to the steps described further below. In FIG. 2, the analyzer module A is attached to network interface 3. Equally well, the analyzer module A may be attached to first terminal 1, to secured network 9, to network interface 4, to second terminal 2, or to any other location suitable for receiving a connection request.

In step S3, the analyzer module A sends to network interface 4 a request for receiving network parameters. In addition, the analyzer module A requests from network interface 3 transmission of its network parameters. For example, these requests may be based on the SNMP (Simple Network Management Protocol) protocol or any other protocol suitable for receiving network parameters of network interfaces. Network parameters of network interfaces may comprise the IP address of the first and the second terminal 1,2, a list of available network interfaces (e.g. Ethernet, WLAN, Bluetooth, etc.), identifications of ISPs (Internet Service Provider), identification of networks, availability of connections towards local or remote devices, etc. Step S3 may be skipped if the analyzer module A already has received valid network parameters beforehand, e.g. when such parameters were received only a definable time period beforehand.

In step S4, the analyzer module A receives network parameters of network interfaces 4, as well as network parameters of network interfaces 3. Step S4 depends on step S3, and will be performed only if step S3 has led to a request for sending updated parameters of network interfaces 3,4. Step S3 and step S4 may be performed by sending and receiving data over secured communications channels 7 and 8.

In step S5, the analyzer module A analyzes parameters of network interfaces 3 and 4, and searches for a network 10 suitable for establishing a peer-to-peer connection between the first terminal 1 and the second terminal 2. For example, parameters of network interface 3 as well as parameters of network interface 4 may indicate the availability of the same WLAN hotspot. In such a case, the network provided by the WLAN hotspot may be considered to be a suitable network 10 for establishing a peer-to-peer connection 11 between the first terminal 1 and second terminal 2. There are many scenarios on how a network 10 for establishing a peer-to-peer connection 11 can be found. For example, the first terminal 1 and the second terminal 2 may be located nearby in the same train. Both terminals may be connected by means of a GPRS service (Generalized Packet Radio Service) to a corporate network 9. Further, both terminals may be equipped with a Bluetooth interface or an IrDA interface. Based on network parameters of the terminals, the analyzer module A may detect that both terminals are within reach of each other, and then decide that an ad-hoc network between the terminals may be a suitable network 10 for establishing a peer-to-peer connection 11 between the terminals. Further, the analyzer module A may detect the availability of several networks suitable for a peer-to-peer connection 11 between the terminals. For redundancy reasons, bandwidth reasons, or for any other reason, the analyzer module may also decide that more than one peer-to-peer connection 11 shall be established between terminal 1 and 2.

In step S6, the analyzer module A sends a connection instruction to the first and/or the second terminal 1,2. The connection instruction may be received and processed by terminals 1,2 as shown in FIG. 2, or the connection instruction may be directly received and processed by network interfaces 3,4. A connection instruction may comprise data for specifying a network interface 3, e.g. a WLAN network interface; it may comprise data for specifying a network 10, e.g. a WLAN network; and it may comprise data for specifying a peer-to-peer connection 11. The terminals 1,2 and/or terminal interfaces 3,4 may then start to establish a peer-to-peer connection according to the connection instruction.

However, before establishing a peer-to-peer connection according to the connection instruction, in step S7, cryptographic data for establishing the peer-to-peer connection between terminals 1 and 2 may be provided to network interfaces 3,4, as shown in FIG. 2, or to the terminals 1,2. For example, on a request sent by terminals 1,2, or sent by the analyzer module A, a central unit C located within the secured network 9 may generate and transmit cryptographic data, such as authentication keys, encryption keys, or security tokens, to network interfaces 3,4, or to terminals 1,2. Upon receipt, the network interfaces 3 and 4, or the terminals 1,2, may establish, according to received cryptographic data and connection instruction, a secured, e.g. authenticated and encrypted, peer-to-peer communications channel 11 over network 10 between terminals 1 and 2.

In step S8, for example as soon as the analyzer module A detects completion of the establishment of the peer-to-peer communications channel 11, the analyzer module A modifies, for example, source address and destination address of the connection request according to the newly established peer-to-peer connection, and sends the modified connection request to terminal 2. By such a modification of a connection request, the establishment of a communications channel between the terminals may become fully transparent to applications or to the user of a terminal.

The central unit C may be configured in such a way that the secured communications channels 7,8 and/or the terminals 1,2 are verified at determinable points in time. Verification may include, for example, that network packets may be sent from the central unit C to terminals 1,2 through secured communications channels 7,8. The central unit C may be configured to send instructions to tear down a peer-to-peer connection between the terminals 1,2 as soon as such a verification fails.

Instead of attaching the analyzer module A to one of the network interfaces 3,4 or terminals 1,2, the analyzer module may also be attached to secured network 9. A connection request generated on terminal 1 will be sent through secured channel 7 to secured network 9. The analyzer module A may be arranged in such a way that the connection request may be received and potentially intercepted by analyzer module A.

Further to data and parameters described above, the analyzer module A may also collect data with respect to network status of the secured network 9, For example, network status of the secured network 9 may comprise a collision rate of data packets detected on definable network interfaces of the secured network 9, e.g. a collision rate detected on routers of the secured network 9. When the analyzer module A receives a connection request generated by the first terminal, besides analyzing the connection request as described above, the analyzer module may also analyze the current network status and make further actions that are dependent on network status. For example, the analyzer module may decide to directly forward the connection request to the second terminal 2 if the network collision rate within the secured network 9 is low, and therefore not to establish a peer-to-peer connection between terminals 1,2. On the other hand, if the analyzer module detects a high collision rate within the secured network 9, the analyzer module may enforce the establishment of a peer-to-peer communications channel between the first and the second terminal even if network parameters of interfaces 3,4 or of network 10 would indicate that only a low speed peer-to-peer connection between terminals 1,2 is available.

Numerous modifications and variations of the present invention are possible in light of the above teachings. It is therefore to be understood that within the scope of the appended claims, the invention may be practiced otherwise than as specifically described herein.

What is claimed is:

1. A method, comprising:
   in a network device:
     intercepting by an analyzer module a connection request transmitted from a first terminal to a second terminal over a secured network, wherein:
       the secured network comprises a private network associated with particular entity,
       the secured network operates according to particular security policy or guidelines, and
       access to the secure network is limited to secured devices;
     analyzing the connection request by the analyzer module;
     transmitting by the analyzer module a request to each of the first terminal and the second terminal, for network parameters distinct to each of the first terminal and the second terminal;
     receiving by the analyzer module, in response to the transmitted requests, the network parameters of the first terminal and the network parameters of the second terminal from each of the first terminal and the second terminal, respectively,
     analyzing the network parameters of the first terminal and of the second terminal by the analyzer module;
     transmitting a connection instruction to one or both of the first terminal and the second terminal from the analyzer module based on the analysis of the connection request and the network parameters of the first terminal and the second terminal, wherein said connection instruction comprises an instruction to enforce a peer-to-peer communications channel, over a network distinct from the secured network, between the first terminal and the second terminal; and
   wherein:
     a first secured communications channel is established between the first terminal and the secured network; and
     a second secured communications channel is established between the second terminal and the secured network; and
     the establishing of the first and the second secured communications channels comprises using public access points for connecting terminals to public networks, using public communications channels between the public networks and the secured network, and using cryptographic modules for authentication of the terminals and for encryption of the first and second secured communications channels between the terminals and the secured network.

2. The method according to claim 1, wherein the peer-to-peer communications channel is established between the first terminal and the second terminal as a secured peer-to-peer communications channel based on one of an authentication module and an encryption module.

3. The method according to claim 2, wherein one or both of an authentication key and an encryption key is provided by a central unit of the secured network to one or both of the authentication module and the encryption module.

4. The method according to claim 1, wherein the peer-to-peer communications channel between the first terminal and the second terminal is established using at least one public network.

5. The method according to claim 1, wherein the peer-to-peer communications channel between the first terminal and the second terminal is established over an ad-hoc network between the first terminal and the second terminal.

6. The method according to claim 1, comprising searching, by the analyzer module, for the network distinct from the secured network capable of supporting the peer-to-peer communications channel based on the intercepted connection request and the network parameters of the first terminal and of the second terminal.

7. The method according to claim 1, wherein the first terminal includes a first network interface and the second terminal includes a second network interface, and the peer-to-peer communications channel is directly between the first network interface of the first terminal and the second network interface of the second terminal.

8. A system, comprising:
   an analyzer module, the analyzer module comprising:
     a receiver that is configured to:
       intercept a connection request transmitted from a first terminal to a second terminal over a secured network, wherein:
         the secured network comprises a private network associated with particular entity,
         the secured network operates according to particular security policy or guidelines, and
         access to the secure network is limited to secured devices, and
       analyze the connection request generated by the first terminal;
     a transmitter that is configured to transmit a request to each of the first terminal and the second terminal for network parameters distinct to each of the first terminal and the second terminal; and
   wherein:
     the receiver is configured to receive the network parameters of the first terminal and the network parameters of the second terminal from the first terminal and the second terminal, respectively, in response to the request from the analyzer module, the analyzer module is configured to analyze the received network parameters of the first terminal and the second terminal,
the transmitter is configured to transmit a connection instruction to
one or both of the first terminal and/or the second terminal based on the analysis of the connection request and the network parameters of the terminals, the connection instruction comprising an instruction to enforce a peer-to-peer communications channel, over a network distinct from the secured network, between the first terminal and the second terminal,
one or both of the first terminal and the second terminal includes one or both of an authentication module and an encryption module, and
the peer-to-peer communications channel is established between the first terminal and the second terminal as a secured peer-to-peer communications channel based on one or both of an authentication module and an encryption module.

9. The system according to claim 8, wherein the secured network comprises a central unit configured to provide one or both of an authentication key and an encryption key to a corresponding one or both of an authentication module and an encryption module.

10. The system according to claim 8, wherein each of the first terminal and the second terminal comprises a controller configured to establish an ad-hoc network between the first terminal and the second terminal.

11. The system according to claim 8, wherein each of the first terminal and the second terminal comprises a controller configured to establish the peer-to-peer communications channel between the first terminal and the second terminal using at least one public network.

12. A method, comprising:
intercepting, by an analyzer module, a connection request transmitted from a first terminal to a second terminal over a secured network;
analyzing, by the analyzer module, the connection request;
transmitting, by the analyzer, module a request to each of the first terminal and the second terminal, for network parameters distinct to each of the first terminal and the second terminal;
receiving, by the analyzer module in response to the transmitted requests, the network parameters of the first terminal and the network parameters of the second terminal from each of the first terminal and the second terminal, respectively,
analyzing, by the analyzer module, the network parameters of the first terminal and of the second terminal; and
transmitting, from the analyzer module, a connection instruction to one or both of the first terminal and the second terminal based on the analysis of the connection request and the network parameters of the first terminal and the second terminal, wherein said connection instruction comprises an instruction to enforce a peer-to-peer communications channel, over a network distinct from the secured network, between the first terminal and the second terminal; and
wherein:
the peer-to-peer communications channel is established between the first terminal and the second terminal as a secured peer-to-peer communications channel based on one of an authentication module and an encryption module;

one or both of an authentication key and an encryption key is provided by a central unit of the secured network to one or both of the authentication module and the encryption module;
the central unit receives parameters on the status of one or both of the first terminal and the second terminal at predetermined points in time; and
the central unit tears down an established peer-to-peer communications channel as soon as the status of the one or both of the first terminal and the second terminal do not meet predetermined conditions.

13. A method, comprising:
in a network device:
intercepting by an analyzer module a connection request transmitted from a first terminal to a second terminal over a secured network, wherein:
the secured network comprises a private network associated with particular entity,
the secured network operates according to particular security policy or guidelines, and
access to the secure network is limited to secured devices;
analyzing the connection request by the analyzer module;
transmitting by the analyzer module a request to each of the first terminal and the second terminal, for network parameters distinct to each of the first terminal and the second terminal;
receiving by the analyzer module, in response to the transmitted requests, the network parameters of the first terminal and the network parameters of the second terminal from each of the first terminal and the second terminal, respectively,
analyzing the network parameters of the first terminal and of the second terminal by the analyzer module;
transmitting a connection instruction to one or both of the first terminal and the second terminal from the analyzer module based on the analysis of the connection request and the network parameters of the first terminal and the second terminal, wherein said connection instruction comprises an instruction to enforce a peer-to-peer communications channel, over a network distinct from the secured network, between the first terminal and the second terminal; and
wherein:
the peer-to-peer communications channel is established between the first terminal and the second terminal as a secured peer-to-peer communications channel based on one of an authentication module and an encryption module; and
one or both of an authentication key and an encryption key is provided by a central unit of the secured network to one or both of the authentication module and the encryption module.

14. The method according to claim 13, wherein the peer-to-peer communications channel between the first terminal and the second terminal is established using at least one public network.

15. The method according to claim 13, wherein the peer-to-peer communications channel between the first terminal and the second terminal is established over an ad-hoc network between the first terminal and the second terminal.

16. The method according to claim 13, comprising searching, by the analyzer module, for the network distinct from the secured network capable of supporting the peer-to-peer communications channel based on the intercepted connection request and the network parameters of the first terminal and of the second terminal.

17. The method according to claim 13, wherein the first terminal includes a first network interface and the second terminal includes a second network interface, and the peer-to-peer communications channel is directly between the first network interface of the first terminal and the second network interface of the second terminal.

18. A system, comprising:
an analyzer module, the analyzer module comprising:
  a receiver that is configured to:
    intercept a connection request transmitted from a first terminal to a second terminal over a secured network, wherein:
      the secured network comprises a private network associated with particular entity,
      the secured network operates according to particular security policy or guidelines, and
      access to the secure network is limited to secured devices, and
    analyze the connection request generated by the first terminal;
  a transmitter that is configured to transmit a request to each of the first terminal and the second terminal for network parameters distinct to each of the first terminal and the second terminal; and
  wherein:
    the receiver is configured to receive the network parameters of the first terminal and the network parameters of the second terminal from the first terminal and the second terminal, respectively, in response to the request from the analyzer module,
    the analyzer module is configured to analyze the received network parameters of the first terminal and the second terminal,
    the transmitter is configured to transmit a connection instruction to one or both of the first terminal and/or the second terminal based on the analysis of the connection request and the network parameters of the terminals, the connection instruction comprising an instruction to enforce a peer-to-peer communications channel, over a network distinct from the secured network, between the first terminal and the second terminal,
    the secured network comprises a central unit configured to provide one or both of an authentication key and an encryption key to a corresponding one or both of an authentication module and an encryption module,
    one or both of the first terminal and the second terminal includes one or both of an authentication module and an encryption module, and
    the secured network comprises a central unit configured to provide one or both of an authentication key and an encryption key to a corresponding one or both of an authentication module and an encryption module.

19. The system according to claim 18, wherein each of the first terminal and the second terminal comprises a controller configured to establish an ad-hoc network between the first terminal and the second terminal.

20. The system according to claim 18, wherein each of the first terminal and the second terminal comprises a controller configured to establish the peer-to-peer communications channel between the first terminal and the second terminal using at least one public network.

* * * * *